US012687850B2

(12) United States Patent
Nagarajan et al.

(10) Patent No.: US 12,687,850 B2
(45) Date of Patent: Jul. 21, 2026

(54) SYSTEMS AND METHODS FOR MAP TRANSFORMATION BETWEEN MOBILE ROBOTS

(71) Applicant: OMRON Corporation, Kyoto (JP)

(72) Inventors: Karthick Phillip Nagarajan, Pleasanton, CA (US); Antonio Nuñez Acuña, Pleasanton, CA (US)

(73) Assignee: OMRON CORPORATION, Kyoto (JP)

( * ) Notice: Subject to any disclaimer, the term of this patent is extended or adjusted under 35 U.S.C. 154(b) by 273 days.

(21) Appl. No.: 18/194,566

(22) Filed: Mar. 31, 2023

(65) Prior Publication Data

US 2024/0329641 A1     Oct. 3, 2024

(51) Int. Cl.
G05D 1/00          (2024.01)

(52) U.S. Cl.
CPC ......... G05D 1/0274 (2013.01); G05D 1/0287 (2013.01)

(58) Field of Classification Search
CPC .... G05D 1/0274; G05D 1/0251; G05D 1/024;
G05D 1/0221; G05D 1/0276; G05D
1/0287; G05D 2105/10; G05D 2109/10;
G05D 1/246; G05D 1/6987; G05D
1/0246; G05D 1/0257; G05D 1/0236;
G05D 1/0234; G05D 1/0255; G05D
1/0272; G05D 1/0223; G05D 1/0212;
G05D 1/0219; G05D 1/0225; G05D
1/0295; G05D 1/0268; G05D 1/0214;
G05D 1/0231; G05D 1/0238; G05D
1/0242; G05D 1/0263; G05D 1/028;
G05D 1/646; G05D 2105/87; G05D
2107/70; G05D 1/02; G05D 1/0291;

G01C 21/005; G01C 21/165; G01C
21/20; G01C 22/00; G01C 21/00; G01C
21/206; G01C 21/32;
(Continued)

(56) References Cited

U.S. PATENT DOCUMENTS 6,496,755 B2 * 12/2002 Wallach ............... G05D 1/0295
701/25
9,146,561 B2 * 9/2015 Al-Buraiki ........... G05D 1/0295
(Continued)

FOREIGN PATENT DOCUMENTS

CN          113535864 A  * 10/2021  ............. G06F 16/29
JP      H 07-271434 A    10/1995
(Continued)

OTHER PUBLICATIONS

International Search Report for International Application No. PCT/JP2024/013140 dated Jun. 11, 2024.

*Primary Examiner* — Rachid Bendidi
*Assistant Examiner* — Irene C Khuu
(74) *Attorney, Agent, or Firm* — Knobbe Martens Olson & Bear LLC

(57)          ABSTRACT

Systems and methods for determining map transformations between mobile robots are described. In some examples, a follower robot follows a target robot through a series of goal locations. The position and trajectory information of the follower robot can be recorded while the follower robot follows the target robot through the plurality of goal locations. Once complete, the compiled position and trajectory data can be analyzed and transformed into a common reference frame, which relates a map of the target robot with a map of the follower robot.

20 Claims, 15 Drawing Sheets

| | R1 | R2 |
|---|---|---|
| Goal 1 | $x_{R1}1, y_{R1}1$ | $x_{R2}1, y_{R2}1$ |
| Goal 2 | $x_{R1}2, y_{R1}2$ | $x_{R2}2, y_{R2}2$ |
| Goal 3 | $x_{R1}3, y_{R1}3$ | $x_{R2}3, y_{R2}3$ |
| Goal 4 | $x_{R1}4, y_{R1}4$ | $x_{R2}4, y_{R2}4$ |
| Goal 5 | $x_{R1}5, y_{R1}5$ | $x_{R2}5, y_{R2}5$ |
| Goal 6 | $x_{R1}6, y_{R1}6$ | $x_{R2}6, y_{R2}6$ |

(58) Field of Classification Search
CPC .... G01C 21/3492; G01C 25/00; G01C 21/34; G01C 21/3804; G01C 21/383; G01C 21/3841; G01C 21/3837; G01S 17/86; G01S 17/06; G01S 17/89; G01S 15/46; G01S 15/89; G01S 1/08; G01S 1/76; G01S 11/12; G01S 17/894; G06F 16/29; G06F 18/22; G06F 18/25; G06F 18/251; G06F 17/11; H04W 4/02; H04W 4/70; H04W 8/26; G06T 7/73; G06T 2207/10028; G06T 17/05; G06T 3/4038; G06T 7/277; G06T 11/00; G06T 2207/20081; G06T 7/74; G06T 2207/20221; G06T 5/50; G06T 2207/30244; G06T 7/30; G06T 7/70; G06T 7/246; B25J 9/1664; B25J 13/088; B25J 19/02; B25J 19/04; Y10S 901/01; Y10S 901/46; A01D 34/008; A01D 2101/00; A61F 9/08; G09B 21/007; G09B 29/004; G09B 29/106
See application file for complete search history.

(56) References Cited

U.S. PATENT DOCUMENTS

| | | | |
|---|---|---|---|
| 2012/0215380 A1* | 8/2012 | Fouillade | G05D 1/0038 701/2 |
| 2013/0060382 A1* | 3/2013 | Pitzer | G05D 1/0274 901/1 |
| 2021/0003418 A1* | 1/2021 | Hatayama | B25J 5/00 |
| 2021/0039265 A1* | 2/2021 | Nam | B25J 9/161 |
| 2021/0405652 A1* | 12/2021 | Kwak | G05D 1/0293 |
| 2022/0061617 A1* | 3/2022 | Byun | A47L 9/28 |

FOREIGN PATENT DOCUMENTS

| | | | | |
|---|---|---|---|---|
| JP | H0727143 A | * 10/1995 | | B25J 5/00 |
| JP | 2020-42366 A | 3/2020 | | |

* cited by examiner

100

| | R1 | R2 |
|---|---|---|
| Goal 1 | $x_{R1}1, y_{R1}1$ | |
| Goal 2 | | |
| Goal 3 | | |
| Goal 4 | | |
| Goal 5 | | |
| Goal 6 | | |

| | R1 | R2 |
|---|---|---|
| Goal 1 | $x_{R1}1, y_{R1}1$ | $x_{R2}1, y_{R2}1$ |
| Goal 2 | $x_{R1}2, y_{R1}2$ | |
| Goal 3 | | |
| Goal 4 | | |
| Goal 5 | | |
| Goal 6 | | |

| | R1 | R2 |
|---|---|---|
| Goal 1 | $x_{R1}1, y_{R1}1$ | $x_{R2}1, y_{R2}1$ |
| Goal 2 | $x_{R1}2, y_{R1}2$ | $x_{R2}2, y_{R2}2$ |
| Goal 3 | $x_{R1}3, y_{R1}3$ | |
| Goal 4 | | |
| Goal 5 | | |
| Goal 6 | | |

| | R1 | R2 |
|---|---|---|
| Goal 1 | $x_{R1}1, y_{R1}1$ | $x_{R2}1, y_{R2}1$ |
| Goal 2 | $x_{R1}2, y_{R1}2$ | $x_{R2}2, y_{R2}2$ |
| Goal 3 | $x_{R1}3, y_{R1}3$ | $x_{R2}3, y_{R2}3$ |
| Goal 4 | $x_{R1}4, y_{R1}4$ | |
| Goal 5 | | |
| Goal 6 | | |

| | R1 | R2 |
|---|---|---|
| Goal 1 | $x_{R1}1, y_{R1}1$ | $x_{R2}1, y_{R2}1$ |
| Goal 2 | $x_{R1}2, y_{R1}2$ | $x_{R2}2, y_{R2}2$ |
| Goal 3 | $x_{R1}3, y_{R1}3$ | $x_{R2}3, y_{R2}3$ |
| Goal 4 | $x_{R1}4, y_{R1}4$ | $x_{R2}4, y_{R2}4$ |
| Goal 5 | $x_{R1}5, y_{R1}5$ | |
| Goal 6 | | |

| | R1 | R2 |
|---|---|---|
| Goal 1 | $x_{R1}1, y_{R1}1$ | $x_{R2}1, y_{R2}1$ |
| Goal 2 | $x_{R1}2, y_{R1}2$ | $x_{R2}2, y_{R2}2$ |
| Goal 3 | $x_{R1}3, y_{R1}3$ | $x_{R2}3, y_{R2}3$ |
| Goal 4 | $x_{R1}4, y_{R1}4$ | $x_{R2}4, y_{R2}4$ |
| Goal 5 | $x_{R1}5, y_{R1}5$ | $x_{R2}5, y_{R2}5$ |
| Goal 6 | $x_{R1}6, y_{R1}6$ | |

| | R1 | R2 |
|---|---|---|
| Goal 1 | $x_{R1}1, y_{R1}1$ | $x_{R2}1, y_{R2}1$ |
| Goal 2 | $x_{R1}2, y_{R1}2$ | $x_{R2}2, y_{R2}2$ |
| Goal 3 | $x_{R1}3, y_{R1}3$ | $x_{R2}3, y_{R2}3$ |
| Goal 4 | $x_{R1}4, y_{R1}4$ | $x_{R2}4, y_{R2}4$ |
| Goal 5 | $x_{R1}5, y_{R1}5$ | $x_{R2}5, y_{R2}5$ |
| Goal 6 | $x_{R1}6, y_{R1}6$ | $x_{R2}6, y_{R2}6$ |

|  | R1 | R2 |
|---|---|---|
| Goal 1 | $x_{R1}1, y_{R1}1$ | $x_{R2}1, y_{R2}1$ |
| Goal 2 | $x_{R1}2, y_{R1}2$ | $x_{R2}2, y_{R2}2$ |
| Goal 3 | $x_{R1}3, y_{R1}3$ | $x_{R2}3, y_{R2}3$ |
| Goal 4 | $x_{R1}4, y_{R1}4$ | $x_{R2}4, y_{R2}4$ |
| Goal 5 | $x_{R1}5, y_{R1}5$ | $x_{R2}5, y_{R2}5$ |
| Goal 6 | $x_{R1}6, y_{R1}6$ | $x_{R2}6, y_{R2}6$ |

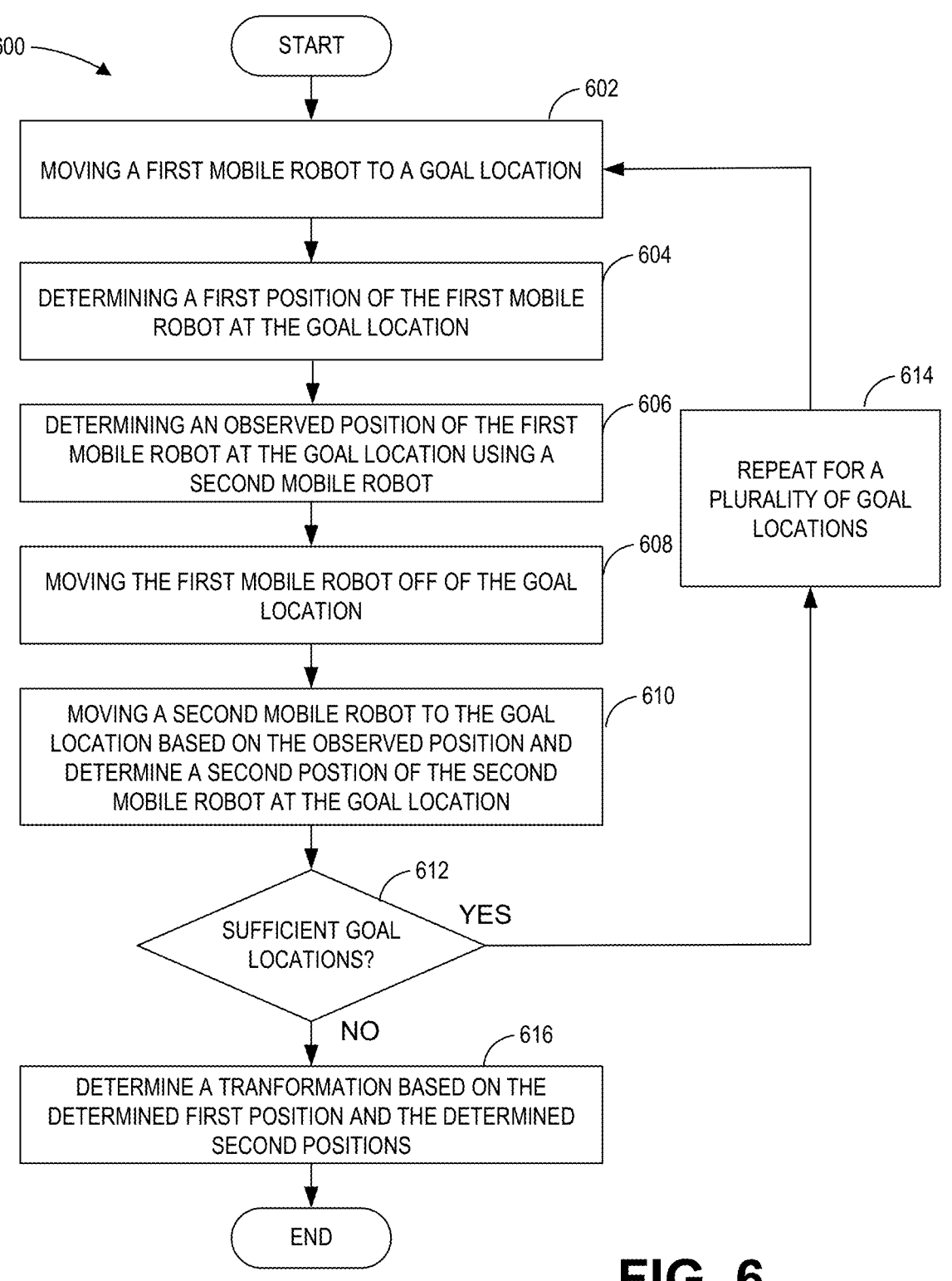

600

START

602 — MOVING A FIRST MOBILE ROBOT TO A GOAL LOCATION

604 — DETERMINING A FIRST POSITION OF THE FIRST MOBILE ROBOT AT THE GOAL LOCATION

606 — DETERMINING AN OBSERVED POSITION OF THE FIRST MOBILE ROBOT AT THE GOAL LOCATION USING A SECOND MOBILE ROBOT

608 — MOVING THE FIRST MOBILE ROBOT OFF OF THE GOAL LOCATION

610 — MOVING A SECOND MOBILE ROBOT TO THE GOAL LOCATION BASED ON THE OBSERVED POSITION AND DETERMINE A SECOND POSTION OF THE SECOND MOBILE ROBOT AT THE GOAL LOCATION

612 — SUFFICIENT GOAL LOCATIONS?

YES

614 — REPEAT FOR A PLURALITY OF GOAL LOCATIONS

NO

616 — DETERMINE A TRANFORMATION BASED ON THE DETERMINED FIRST POSITION AND THE DETERMINED SECOND POSITIONS

END

FIG. 6

| | R1 | R2 |
|---|---|---|
| Goal 1 | $x_{R1}1, y_{R1}1$ | $x_{R2}1, y_{R2}1$ |
| Goal 2 | $x_{R1}2, y_{R1}2$ | $x_{R2}2, y_{R2}2$ |
| Goal 3 | $x_{R1}3, y_{R1}3$ | $x_{R2}3, y_{R2}3$ |
| Goal 4 | $x_{R1}4, y_{R1}4$ | $x_{R2}4, y_{R2}4$ |
| Goal 5 | $x_{R1}5, y_{R1}5$ | $x_{R2}5, y_{R2}5$ |
| Goal 6 | $x_{R1}6, y_{R1}6$ | $x_{R2}6, y_{R2}6$ |

SYSTEMS AND METHODS FOR MAP TRANSFORMATION BETWEEN MOBILE ROBOTS

BACKGROUND

Field

Some embodiments described herein relate to systems and methods for determining map transformations between robots, such as mobile robots.

Description

Mobile robots can be used to perform a wide variety of tasks within a working environment. For example, within a manufacturing facility or warehouse, mobile robots may be used to move materials throughout the working environment. In some instances, a plurality of mobile robots can be provided within the working environment, and the movements of the plurality of mobile robots must be coordinate to avoid collisions and maximize efficiency.

SUMMARY

Mobile robots, whether autonomous or guided, often use a map of their working environment to navigate. For some mobile robots, this map is determined or generated using various sensing capabilities of the mobile robot (e.g., image sensors, LiDAR sensors, etc.), which can vary depending on the particular manufacturer or model of the mobile robot. In some instances, there may even be differences between mobile robots from the same manufacturer and of the same model due to physical differences between individual units. Due to these differences in the various sensing capabilities of different mobile robots, as well as to other factors associated with the mobile robots, the maps of the working environment determined by different mobile robots can vary or differ.

Different mobile robots operating in the same working environment need to work effectively with each other, for example, to share working areas and resources, exchange interoperability demands, avoid collisions, coordinate movements, and maximize efficiencies. The above-noted differences between the maps of the working environment determined by different mobile robots interfere with or limit the ability of mobile robots working within a common working environment to work effectively together. It can be highly advantageous to provide or determine a common reference map in which the position and movements of all or many of the mobile robots, as well as other objects or obstacles within the working environment, can be determined.

This application provides methods and systems for determining map transformations between different mobile robots. In some instances, the systems and methods can be automatic or unsupervised. That is, in some instances, the systems and methods can be performed by the mobile robots themselves in an automated manner, requiring little or no human involvement. The methods and systems for determining map transformations between different mobile robots can include calculating or determining transformation parameters for synchronizing the map data for different mobile robots and/or for accurately representing the position and trajectory information of the mobile robots in a shared reference frame.

In some examples, the systems and methods for determining map transformations between different mobile robots can use a follower robot autonomously following a target robot through a series of tasks, such as movements. For example, the series of tasks can include moving the target robot through a plurality of goal locations, with the follower robot following the target robot through each of the plurality of goal locations. The position and trajectory information of the follower robot can be recorded while the follower follows the target robot through the plurality of goal locations. Once complete, the compiled position and trajectory data can be analyzed and automatically transformed into a common reference frame, which relates a map of the target robot with a map of the follower robot. In some embodiments, these processes can be repeated for additional mobile robots within the working environment until the position and trajectory information of all mobile robots can be represented within the common reference from. This can be highly advantageous because, using this reference frame, a master control system can operate all mobile robots in the working environment effectively and with high accuracy, regardless of differences between the platforms.

In some aspects, the techniques described herein relate to a method for determining a map transformation between mobile robots, the method including: causing a first mobile robot to move to each of a plurality of goal locations within a working environment, and, with the first mobile robot positioned at each of the plurality of goal locations: determining a first position of the first mobile robot within a first map associated with the first mobile robot, and determining an observed position of the first mobile robot relative to a position of a second mobile robot based on data from at least one environmental sensor of the second mobile robot; causing the second mobile robot to move to each observed position, and with the second mobile robot positioned at each observed position, determining a second position of the second mobile robot within the second map associated with the second mobile robot; and determining a transformation between the first map associated with the first mobile robot and the second map associated with the second mobile robot based on the determined first positions and the determined second positions.

In some aspects, the techniques described herein relate to a mobile robot management system, including: a communication module configured to communicate with at least a first mobile robot and a second mobile robot in a working environment; a processor; and computer-readable memory in communication with the processor, the memory storing instructions that are executable by the processor to cause the system to: cause the first mobile robot to move to each of a plurality of goal locations within the working environment, and, with the first mobile robot positioned at each of the plurality of goal locations: determine a first position of the first mobile robot within a first map associated with the first mobile robot, and determine an observed position of the first mobile robot relative to a second mobile robot based on data from at least one environmental sensor of the second mobile robot; cause the second mobile robot to move to each observed position, and with the second mobile robot positioned at each observed position, determine a second position of the second mobile robot within the second map associated with the second mobile robot; and determine a transformation between the first map associated with the first mobile robot and the second map associated with the second mobile robot based on the determined first positions and the determined second positions.

In some aspects, the techniques described herein relate to a mobile robot, including: a drive system configured to move the mobile robot; at least one environmental sensor; a processor; and computer-readable memory in communication with the processor, the memory storing instructions that are executable by the processor to cause the mobile robot to: for each of a plurality of goal locations through which a target mobile robot moves: receive, from the target mobile robot, a first position of the target mobile robot within a first map associated with the target mobile robot, and determine an observed position of the target mobile robot relative to a current position of the mobile robot based on data from the at least one environmental sensor of the mobile robot; cause the mobile robot to move to the observed position, and with the mobile robot positioned at the observed position, determine a second position of the mobile robot within the second map associated with the mobile robot; and determine a transformation between the first map associated with the target mobile robot and the second map associated with the mobile robot based on the determined first positions and the determined second positions.

In some aspects, the techniques described herein relate to a mobile robot, including: a drive system configured to move the mobile robot; at least one environmental sensor; a processor; and computer-readable memory in communication with the processor, the memory storing instructions that are executable by the processor to cause the mobile robot to: for each of a plurality of goal locations through which a target mobile robot moves: receive, from the target mobile robot, a first position of the target mobile robot within a first map associated with the target mobile robot, and determine an observed position of the target mobile robot relative to a current position of the mobile robot based on data from the at least one environmental sensor of the mobile robot; and based on the observed position, determine a second position of the target mobile robot within the second map associated with the mobile robot; and determine a transformation between the first map associated with the target mobile robot and the second map associated with the mobile robot based on the determined first positions and the determined second positions.

In some aspects, the techniques described herein relate to a method for determining a map transformation between mobile robots, the method including: causing a first mobile robot to move to each of a plurality of goal locations within a working environment, and, with the first mobile robot positioned at each of the plurality of goal locations: determining a first position of the first mobile robot within a first map associated with the first mobile robot, and determining an observed position of the first mobile robot relative to a position of a second mobile robot based on data from at least one environmental sensor of the second mobile robot; and based on the observed position, determining a a second position of the first mobile robot within the second map associated with the second mobile robot; and determining a transformation between the first map associated with the first mobile robot and the second map associated with the second mobile robot based on the determined first positions and the determined second positions.

For purposes of this summary, certain aspects, advantages, and novel features of the disclosure have been described. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

FIG. 6 is a flow chart illustrating an example method or process for determining a map transformation between mobile robots.

DETAILED DESCRIPTION

Figure 1:
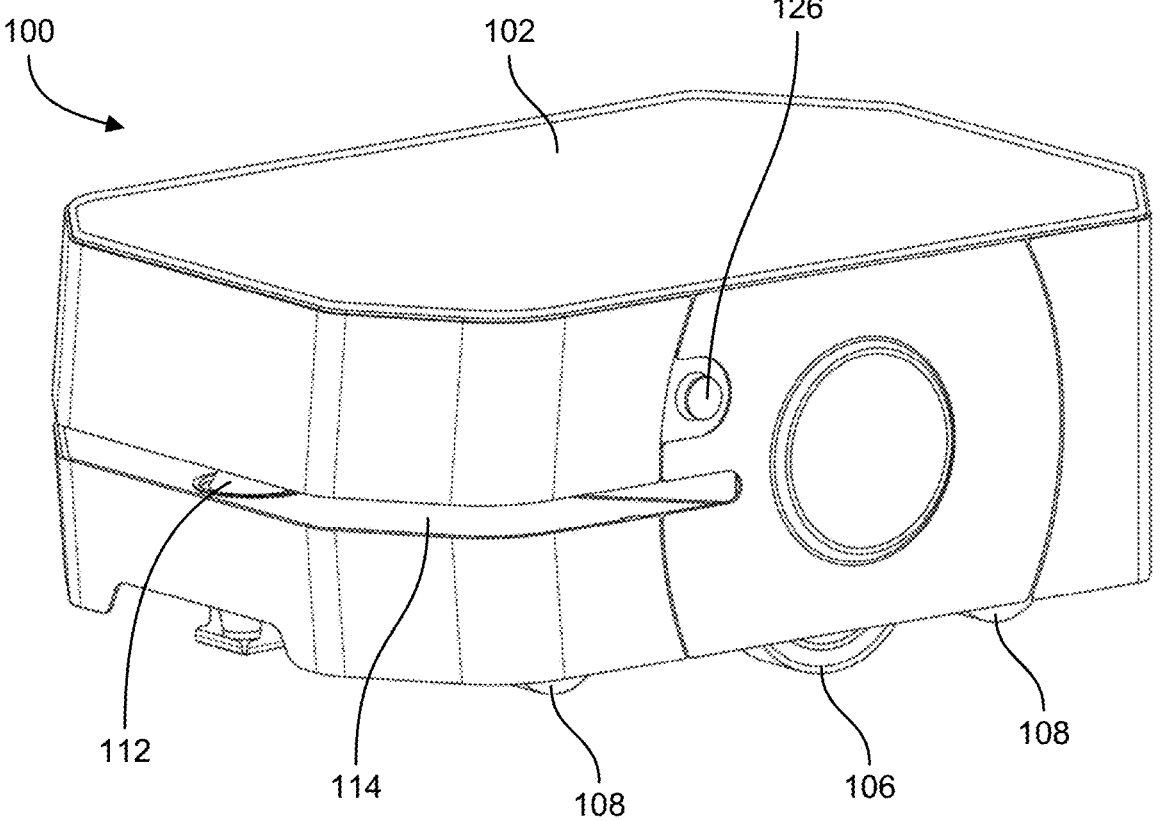
FIG. 1 shows an example embodiment of a mobile robot.

This disclosure describes various systems, devices, and methods for determining map transformations between mobile robots. The map transformations can be used, for example, by a master controller and/or individual mobile robots in order to view position and/or trajectory information of a plurality of mobile robots within a common reference frame or map. Use of a common reference frame or map can improve interoperability of the plurality of mobile robots by, for example, allowing them to better share positions, trajectories, working areas, resources, and interoperability demands amongst the plurality of robots.

As discussed briefly above, mobile robots often use a map of their working environment to navigate. In some instances, the map can be pre-computed or determined in substantially real time by the mobile robot. For example, a mobile robot's map can be determined or generated by the mobile robot using the mobile robot's sensing capabilities. However, the sensing capabilities of different mobile robots can vary. Mobile robots from different manufacturers or of different models may include different types of sensors. Further, in some instances, the sensing capabilities of mobile robots of even the same make and model may vary, due to slight variation and physical differences between individual units.

In general, each mobile robot may determine its own position and trajectory within its own individual map. Additionally, each mobile robot may determine, based on data derived from the mobile robot's sensors, the position of other mobile robots and the position of various obstacles or objects within the working environment. In some instances, a mobile robot can determine the position of various obstacles or objects within its own map. In some instances, a mobile robot can determine the distance and direction (e.g. the linear distance and rotational position) between the current position of the mobile robot and an obstacle or object detectable with the sensors of the mobile robot. With each mobile robot operating with reference to its own individual map, sharing of data between two or more mobile robots is difficult. For example, a first mobile robot's self-reported position and orientation (within its own individual map) is unlikely to be useful to a second mobile robot because, for example, the coordinate systems associated with the individual maps of the first and second mobile robots may not be the same. As an example, an (x, y) position in the first robot's individual map, may not match the same (x, y) position on the second robot's individual map.

Accordingly, to facilitate sharing of map-based information (such as positions, trajectories, movement paths, or the like, of mobile robots, objects, or obstacles within the working environment) between or amongst two or more mobile robots, it may be desirable to provide all such information within a common reference frame or map. That is, it may be desirable to determine transformations that all information determined with respect to the map of an individual mobile robot to be represented either within the map of another mobile robot or within a common reference frame or map. In this way, mobile robots can receive and use information determined or provided by other mobile robots within the working environment. This can facilitate coordinated movements, avoid collisions, increase overall efficiency, etc.

Some methods and systems for determining map transformations require significant manual interaction. For example, one can manually identify a set of feature points from the individual maps generated by two different mobile robots and mathematically correlate them to determine a transformation therebetween. This process, however, may be disadvantageous in that it is generally performed manually, can be prone to error, and does not work well when the two individual maps do not contain clearly identifiable features relating to the same physical objects. Another example that disadvantageously requires manual involvement can include manually moving two mobile robots to the same physical locations, recording their positional data at each location, and mathematically computing a transformation therebetween. This can be disadvantageous in that it is generally a manual process and can be prone to error, and further because it is difficult to move the mobile robots such that they stop at the exact same physical location and orientation. An additional method for determining map transformations between mobile robots can include the use of advanced map-merging algorithms. This can be disadvantageous, though, as it can involve quite advanced and complex techniques and may not work well for all types of maps.

This disclosure provides additional systems, devices, and methods for determining map transformations between mobile robots that reduce or eliminate one or more of the above-noted disadvantages and/or provide other advantages and benefits as described herein. In some embodiments, the systems, devices, and methods for determining map transformations between mobile robots described herein can be performed on an automatic and/or unsupervised basis, for example, without requiring any human interaction or with requiring minimal human interaction. For example, a mobile robot or a mobile controller can be configured to automatically trigger or implement the systems, devices, and methods for determining map transformations between mobile robots upon detecting an additional mobile robot within the working environment or when attempting or desiring to share information between two mobile robots. In some embodiments, the systems, devices, and methods for determining map transformations between mobile robots can be triggered manually, albeit with minimal human interaction. For example, in some instances, a human can provide a command that causes one or more mobile robots to implement the systems, devices, and methods for determining map transformations between mobile robots.

As introduced above, in some examples, the systems, devices, and methods for determining map transformations between different mobile robots can use a follower robot autonomously following a target robot through a series of tasks, such as movements. For example, the series of tasks can include moving the target robot through a plurality of goal locations, with the follower robot following the target robot through each of the plurality of goal locations. The position and trajectory information of the follower robot can be recorded while the follower follows the target robot through the plurality of goal locations. Once complete, the compiled position and trajectory data can be analyzed and automatically transformed into a common reference frame, which relates a map of the target robot with a map of the follower robot.

For example, a target robot may go to a goal location and report its position within its own map. The follower robot may observe the target robot at the goal location and determine a position of the target robot relative to the current position of the follower robot. For example, the follower robot may determine the distance and direction to the target robot (which is at the goal location) relative to its current position. Notably, in some instances, the follower robot does not need to know the position of the goal location. Using the determined relative position, the follower robot can then move to the goal location, for example, using encoder based motion based on the determined distance and direction, to move to the observed position. At this position, the follower robot can record its position within its own map. Since the follower robot has moved to the observed position, it is now positions at the goal location, and thus the goal location is now known with respect to the individual maps of the target robot and the follower robot. This process can be repeated for multiple different goal locations and the resulting data can be used to determine a transformation between the two maps.

In an alternative embodiment, the target robot may move through a plurality of goal locations, while a second robot observes the position of the target robot at each goal location using sensors of the second robot. Based on the observed positions, the second robot can determine the position of the target robot within its own map. These determined positions of the goal locations by the second robot can be used with reported positions of the goal locations by the target robot to determine a transformation between the two maps. In some embodiments, this can be accomplished without moving the second robot at all, as long as the second robot can observe the target at each position. In some instances, the second robot may move or follow the target robot so as to observe the target robot at each goal location.

In some embodiments, rather than using a plurality of discrete goal locations, a continuous movement path can be used. In some embodiments, these processes can be repeated for additional mobile robots within the working environment until the position and trajectory information of all mobile robots can be represented within the common reference from. This can be highly advantageous because, using this reference frame, a master control system can operate all mobile robots in the working environment effectively and with high accuracy, regardless of differences between the platforms.

The various features and advantages of the systems, devices, and methods for determining map transformations between mobile robots described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Figure 2:
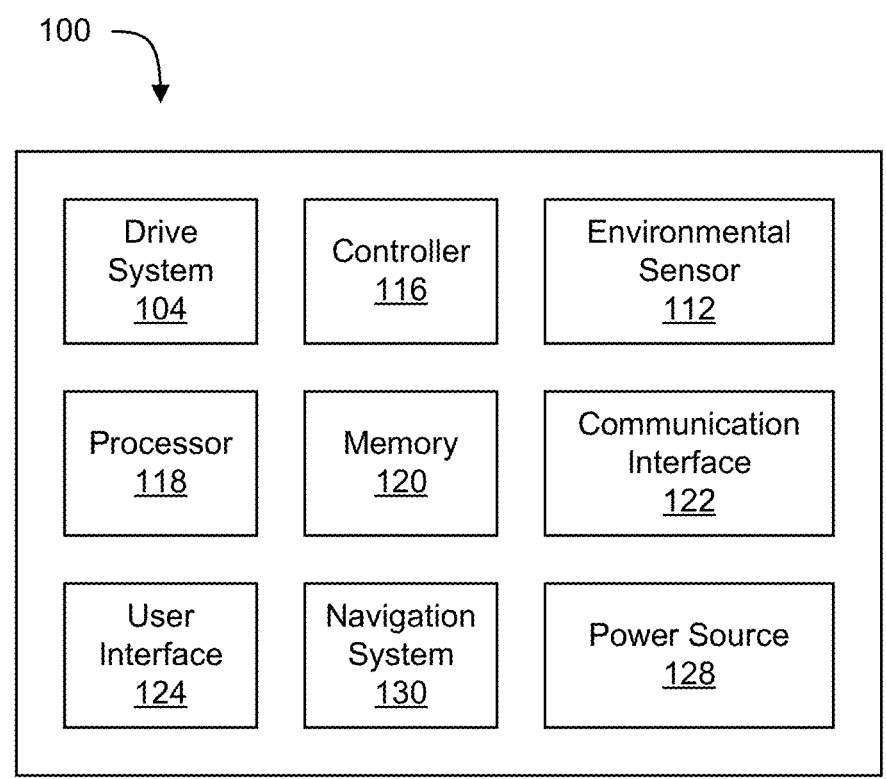
FIG. 2 is a schematic diagram of an example embodiments of a mobile robot.

FIG. 1 shows an example embodiment of a mobile robot 100, and FIG. 2 shows a schematic diagram of the mobile robot 100. The mobile robot 100 can have a chassis or housing 102, which can support various other components of the robot 100. Some components can be disposed inside the housing 102, and some components can be at least partially exposed so that they can interact with entities outside the housing 102. The mobile robot 100 can have a drive system 104, which can be configured to move the mobile robot 100. For example, the mobile robot 100 can have one or more driven wheels 106, which can be driven by at least one motor (not visible in FIG. 1). In some embodiments, two or more driven wheels 106 can be independently driven to cause the mobile robot 100 to move forward, move backward, turn, etc. In some embodiments, a steering mechanism (e.g., a pivoting wheel) can turn the mobile robot 100. In some cases, one or more non-driven wheels 108 can provide support to the robot 100. Various other suitable drive systems can be used, such as tracks or legs.

The mobile robot 100 can have one or more environmental sensors 112, which can be used to sense or measure the environment around the robot 100. The environmental sensor(s) 112 can be a LiDAR (Light Detection and Ranging) system, for example. The environmental sensor(s) 112 can include at least one laser, which can emit laser pulses across a range of angles. The environmental sensor(s) 112 can include a light detector, which can receive light from the laser pulses that was reflected by the environment (e.g., objects) around the mobile robot 100. The received light can be used to determine the location over objects around the mobile robot 100. For example, the direction of the emitted laser pulse and/or the direction of the received light can indicate the direction of the object, and the timing of the emitted laser pulse and/or the received light (e.g., time-of-flight) can indicate the distance of the object from the robot. The housing 102 of the mobile robot 100 can have an opening 114, such as a generally horizontal slit, to permit light to exit and enter the environmental sensor(s) 112 of the mobile robot 100 (e.g., across a range of angles). Various other types of environmental sensors 112 could be used, such a camera, a video analysis system that analyzes video from a camera on the robot 100 to identify objects or other environmental features, a sonar system, and/or a heat sensor, etc. Further, the environmental sensor(s) 112 can be located in other locations on the housing 102 of the mobile robot 100.

Figure 3:
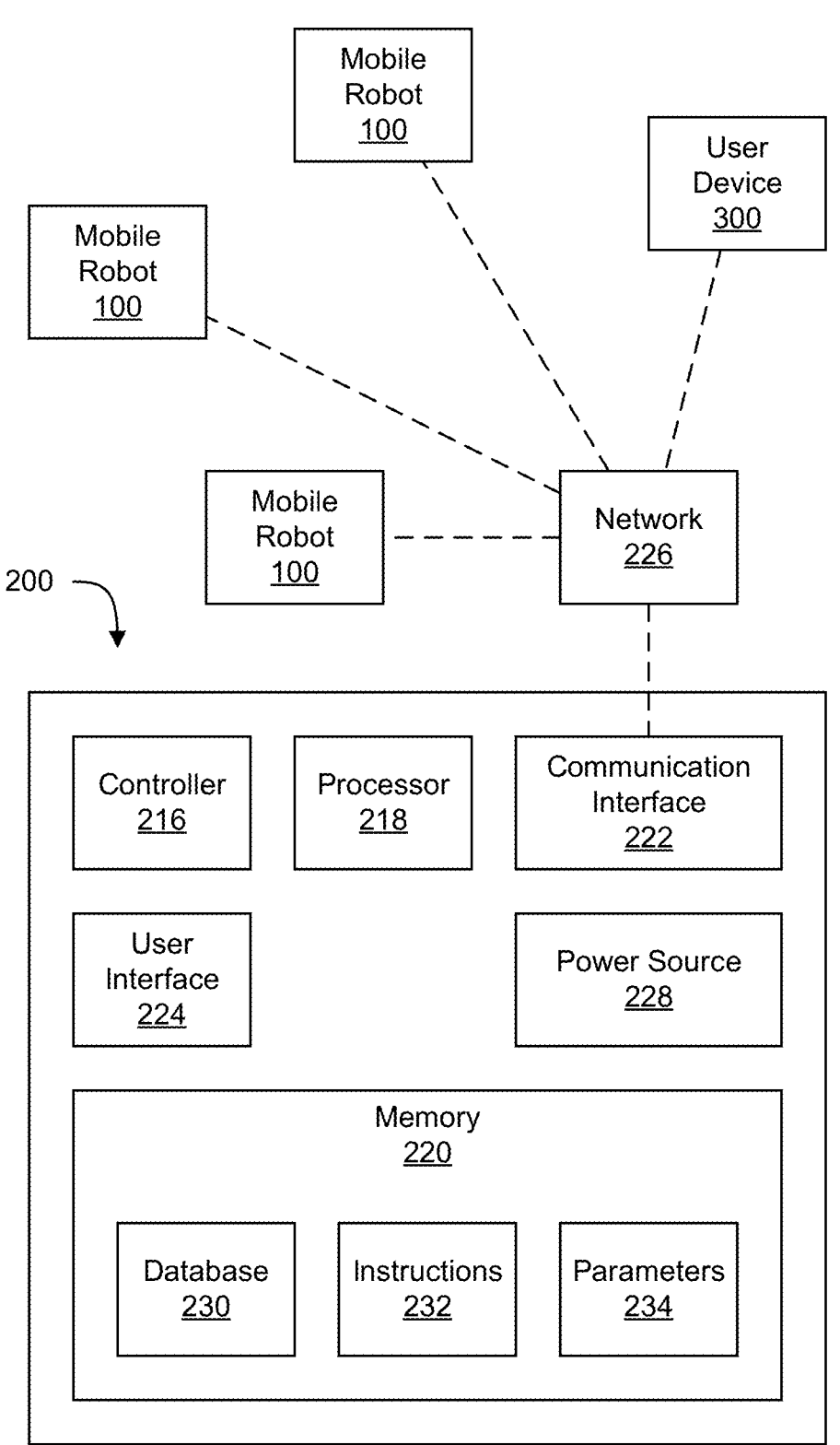
FIG. 3 is a schematic diagram of a mobile robot management system in communication with mobile robots and a user device.
Figure 4A:
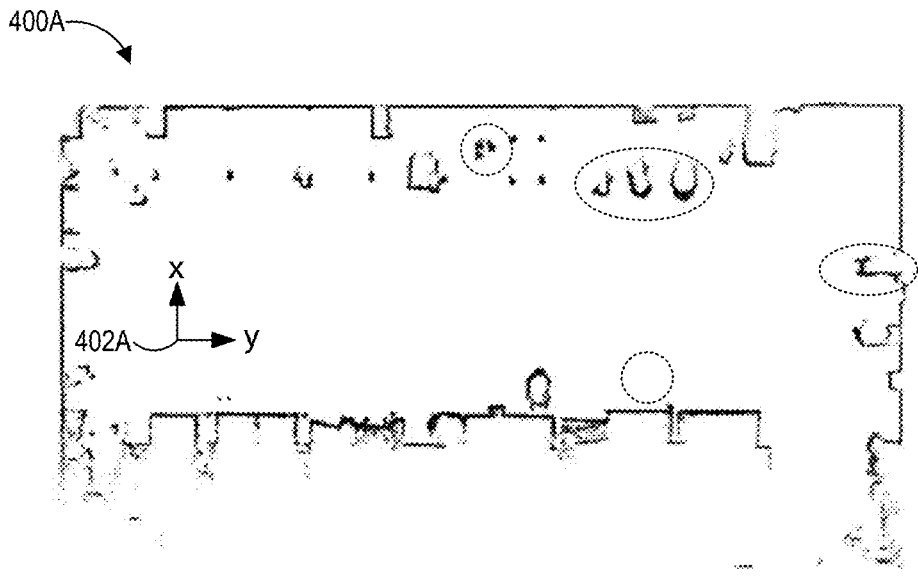
FIG. 4A is an example illustration of a map of a working environment determined by a first mobile robot.
Figure 4B:
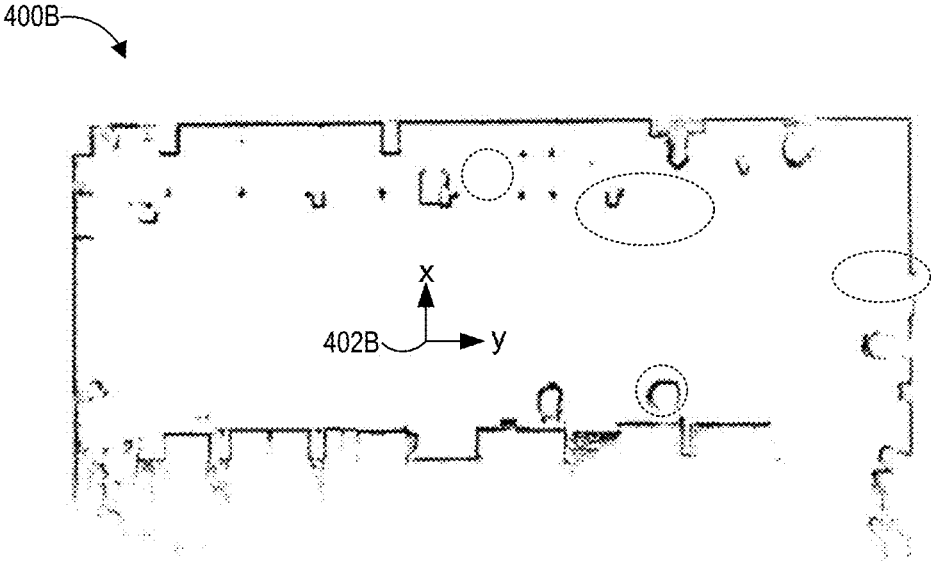
FIG. 4B is an example illustration of a map of the same working environment of FIG. 4A determined by a second mobile robot.

The mobile robot 100 can include a controller 116, which can operate various aspects of the mobile robot 100. For example, the controller 116 can interpret information from the environmental sensor(s) 112, such as to identify objects, determine distances to or locations of objects, operate the drive system 104, perform navigation and/or collision avoidance operations, communicate with the robot management system (e.g., as shown in FIG. 3), or various other features and functions of the mobile robot 100. The various functions of the mobile robot 100 disclosed herein can be implemented by the controller 116, even where the controller 116 is not specifically discussed. In some embodiments, the controller 116 can determine or generate a map of the working environment detected or perceived by the environmental sensor(s) 112. Example maps are shown in FIGS. 4A and 4B, which are discussed in more detail below. However, in many instances, the map generated by one mobile robot 100 may differ (to varying degrees) with a map generated by another mobile robot 100 for the reasons discussed previously. For example, one mobile robot 100 may include different types or configurations of environmental sensors 112.

The mobile robot 100 can include at least one processor 118, which can be a hardware processor. The processor 118 can include circuitry configured to execute operations to implement the various functions and features discussed herein. In some embodiments, the mobile robot 100 can include multiple processors 118, and different tasks can be performed by different processors 118. The mobile robot 100 can include memory 120, which can be computer-readable memory (e.g., non-transitory computer-readable memory). The memory 120 can include RAM, ROM, non-volatile memory, flash memory, a hard disc, or any other suitable type of memory. In some embodiments, the mobile robot 100 can include multiple memory components, which can store different types of information or instructions for different function or features. The memory 120 can include instructions that can be executed by the at least one processor 118 to implement the controller 116 and/or to perform the various functions and features disclosed herein. In some embodiments, the functions and/or features can be implemented by an integrated circuit or other special purpose processor that is specifically configured to perform the functions and features disclosed herein. In some cases, the controller 116 can include a plurality of control modules. Different tasks or functions can be performed by different control modules (e.g., different processors 118 and/or different sets of software instructions).

The mobile robot 100 can include a communication interface 122, which can be used to send information from the robot 100 and/or to receive information from the robot management system or some other external device. The communication interface 122 can be wireless, such as using WiFi, Bluetooth, or any other suitable wireless communication protocol. In some embodiments, the communication interface 122 can include a wired connection. For example, the communication interface 122 can include a port or a plug, which can be configured to connect to a corresponding plug or port that is coupled to an external device, to enable communication therebetween, in some situations. For example, a USB port can be used, although various types of ports or other wired connections could be used. In some cases, a user can couple a laptop, smartphone, or other computer device to the mobile robot 100 via the communication interface for adjusting parameters of the mobile robot 100, for diagnosing issues with the mobile robot 100, for updating features of the mobile robot 100, etc. In some embodiments, the communication interface 122 can be used to communicate information regarding the position and/or trajectory of the mobile robot 100 determined with respect to the mobile robot's map with other mobile robots and/or with a robot management system (for example, as shown in FIG. 3). Similarly, the communication interface 122 can be configured to receive position, trajectory, and/or other map-based information from other mobile robots in the working environment. As described herein, map-based information can be transformed into a reference frame associated with the map of the mobile robot 100 or into a general reference frame to account for differences between the maps of different mobile robots.

The mobile robot 100 can include a user interface 124, which can be used to receive input from a user and/or to provide output (e.g., information) to a user. The user interface 124 can include one or more buttons 126, switches, dials, or other user input elements, a touchscreen, a display, one or more lights, a speaker, a microphone, etc. In some cases, a user can provide input to adjust parameters of the mobile robot 100.

The mobile robot 100 can include a power source 128, which can be a battery. The battery can be rechargeable, and the mobile robot 100 can be configured to dock with a recharging station for regarding the battery (e.g., through an electrical interface). The power source 128 can provide electrical power to operate the drive system 104 (e.g., one or more electric motors), the various sensors and controllers and other systems disclosed herein. The power source 128 can provide DC or AC power, and any suitable type of power source 128 could be used.

The mobile robot 100 can include a navigation system 130. The navigation system 130 can be used to perform path finding for the mobile robot 100. The navigation system 130 can receive a destination and/or one or more waypoints, such as from the user interface 124 or the communication interface 122. The navigation system 130 can receive environmental information (e.g., object locations) from the environmental sensor 112, and can use that information to determine trajectory information to navigate the mobile robot 100 (e.g., towards a destination). The trajectory information can include a path or route, such as from the robot's current location to the target location (e.g., task location or other destination or waypoint). In some cases, the navigation system 130 can determine intermediate waypoints based on the environmental information. In some embodiments, the navigation system 130 can modify the trajectory information while the mobile robot 100 is moving. For example, if an object moves or a new object is detected (e.g., by the environment sensor 112), the navigation system 130 can determine to change the path or route of the mobile robot 100.

The information determined, sent, and/or received by the navigation system may, according to the systems, methods, and devices of the present disclosure be transformed into a reference frame associated with the mobile robot 100 or into a general reference frame to account for differences in maps between different mobile robots.

FIG. 3 shows a schematic diagram of a mobile robot management system 200, which can manage a fleet of mobile robots 100. In FIG. 3, three mobile robots 100 are shown, but any suitable number of robots 100 can be managed by the system 200, such as 2, 4, 8, 12, 20, 30, 40, 50 robots or more, or any values or ranges between these numbers. The robot management system 200 can manage robots in a factory, office, hospital, retail store, warehouse, or any other suitable facility, such as that has task to be performed by robots 100 at various locations. The robot management system 200 can include or user many of the features and/or functions disclosed in the '586 patent. The robot management system 200 can include a controller 216, which can operate various aspect of the robot management system 200, as described herein. For example, the controller 216 can facilitate determination of transformations between maps of different mobile robots as described herein and/or apply determined transforms to map-based information sent or received to various different mobile robots 100. The various functions of the robot management system 200 disclosed herein can be implemented by the controller 216, even where the controller 216 is not specifically discussed.

The robot management system 200 can include at least one processor 218, which can be a hardware processor. The processor 218 can include circuitry configured to execute operations to implement the various functions and features discussed herein, such as the systems and methods for determining map transformations between robots. In some embodiments, the robot management system 200 can include multiple processors 218, and different tasks can be performed by different processors 218. The robot management system 200 can include memory 220, which can be computer-readable memory (e.g., non-transitory computer-readable memory). The memory 220 can include RAM, ROM, non-volatile memory, flash memory, a hard disc, or any other suitable type of memory. In some embodiments, the robot management system 200 can include multiple memory components, which can store different types of information or instructions for different function or features. The memory 220 can include instructions that can be executed by the at least one processor 218 to implement the controller 216 and/or to perform the various functions and features of the management system 200. In some embodiments, the functions and/or features of the robot management system 200 can be implemented by an integrated circuit or other special purpose processor that is specifically configured to perform the functions and features disclosed herein. In some cases, the controller 216 can include a plurality of control modules. Different tasks or functions can be performed by different control modules (e.g., different processors 218 and/or different sets of software instructions).

The robot management system 200 can include a communication interface 222, which can be used to send information from the robot management system 200 to the robots 100 and/or to other systems or devices. The communication interface 222 can receive information from the robots 100 and/or other systems or devices. The communication interface 222 can be a wireless communication interface, such as using WiFi, Bluetooth, or any other suitable wireless communication protocol. In some embodiments, the communication interface 222 can include a wired connection. For example, the communication interface 222 can include a port or a plug, which can be configured to connect to a corresponding plug or port that is coupled to an external device, to enable communication therebetween, in some situations. For example, a USB port can be used, although various types of ports or other wired connections could be used. In some cases, a user can couple a laptop, smartphone, or other computer device to the robot management system 200 via the communication interface for adjusting parameter 234 of the robot management system 200, for diagnosing or troubleshooting issues, for updating features of the robot management system 200, etc. The robot management system 200 can communicate with the robots 100 and/or other systems or devices over a network 226, which can be a wireless network, such as a WiFi network. The network 226 can be a shared network that communicates other types of information as well as information relating to management of the fleet of robots 100. In some embodiments, the network 226 can be a dedicated network, which can be used exclusively for operating the fleet of robots. In some embodiments, the communication interface 22 can be used to communicate information regarding the position and/or trajectory of the mobile robots 100 determined with respect to the individual mobile robot's map with other mobile robots. Similarly, the communication interface 222 can be configured to receive position, trajectory, and/or other map-based information from the mobile robots 100 in the working environment. As described herein, map-based information can be transformed into a reference frame associated with the map of the mobile robot 100 or into a general reference frame to account for differences between the maps of different mobile robots.

The robot management system 200 can communicate with an external system or device, such as a user device 300, over the network 226, or in any other suitable manner. The user device 300 can be a user terminal or other computing device at a work station or other location in the facility that uses the fleet of robots. For example, the user device 300 can be at a computer at a factory workstation, at an office workstation, a nurse workstation, a patient room, a point of sale station, a manager desk or office, etc. The user device 300 can be mobile user device, such as a smartphone, a tablet computer, etc. The user device 300 can send tasks to the robot management system 200 to be assigned to the robots 100. In some cases, multiple user devices 300 can be used. One or more of the user devices 300 can be located at the environment with the mobile robots 100 or can be remote to the environment with the mobile robots 100 (e.g., communicating over the internet or some other wide area network).

The robot management system 200 can include a user interface 224, which can be used to receive input from a user and/or to provide output (e.g., information) to a user. The user interface 224 can include one or more buttons, switches, dials, or other user input elements, a keyboard, a touchscreen, a display, one or more lights, a speaker, a microphone, etc. In some cases, a user can provide input to adjust parameter of the robot management system 200 via the user interface 224, or via the user device 300.

The robot management system 200 can include a power source 228, which can be a wired power connection (e.g., such as configured to plug into an outlet). In some cases, a battery (e.g., rechargeable) can be used. The power source 228 can provide electrical power to operate the robot management system 200 as disclosed herein. The power source 228 can provide DC or AC power, and any suitable type of power source 228 could be used.

FIGS. 4A and 4B illustrate two example maps 400a, 400b of a working environment as determined by two different mobile robots. The map 400a can be a map of the working environment as determined by a first mobile robot operating within the working environment, and the map 400b can be a map of the working environment as determined by a second mobile robot operating within the working environment.

Comparing FIGS. 4A and 4B, one can appreciate that there are many similarities between the map 400a determined by the first mobile robot (FIG. 4A) and the map 400b determined by the second mobile robot (FIG. 4B). For example, the general shape and size of the working environment as represented in maps 400a, 400b is similar. However, careful inspection of the maps 400a, 400b reveals that some differences between the two maps exist. In FIGS. 4A and 4B, certain areas of the maps 400a, 400b have been highlighted (using dashed-line circles) where differences between the maps 400a, 400b exist.

The differences between the maps 400a, 400b can arise from various causes. For example, and as discussed above, the differences between the maps 400a, 400b can be caused by differences between the first and second mobile robots. For example, the first mobile robot may be of a first type (e.g., of a first make and model), while the second mobile robot may be of a second type (e.g., of a second make and model). The first and second mobile robots may thus be equipped with different numbers and/or types of environmental sensors (see environmental sensors 112 described with reference to FIGS. 1 and 2). The difference in the number and/or types of sensors included on the first and second mobile robots can cause some or all of the differences between the maps 400a, 400b. Further, it should be noted that, even if the first and second mobile robots are of the same type (e.g., the same make and model), small variations between the first and second mobile robots can cause differences in the maps 400a. 400b.

Additionally, some or all of the differences between the maps 400a, 400b can be attributed to the current and/or past positions of the first and second mobile robots within the working environment. For example, the first and second mobile robots may each generate the corresponding maps 400a, 400b as they move through the working environment. The maps 400a, 400b are generated based on data determined by the environmental sensors of the first and second mobile robots. The environmental sensors can be associated with a field of view and only objects within the field of view of the environmental sensors are perceived, and resultingly, mapped. Thus, some objects present within map 400a (FIG. 4A) but not present within map 400b (FIG. 4B) have been mapped by the first mobile robot (e.g., when these objects have been detected within the field of view of the environmental sensors of the first mobile robots), but have not been mapped by the second mobile robot because they have not fallen within the field of view of the environmental sensors of the second mobile robot and thus are not represented in the map 400b. This case illustrates another reason why sharing of map-based data between the first and second mobile robots can be important: the positions of obstacles mapped by one mobile robot can be shared with other mobile robots who have not yet perceived those obstacles with their own environmental sensors.

Further, as shown in FIGS. 4A and 4B, the maps 400a, 400b may each have their own reference frame or coordinate system 402a, 402b. This can be because the first and second mobile robots each determine map-based information within or with respect to their own, individual coordinate system.

For various reasons, the reference frames or coordinate systems 402a, 402b associated with the first and second mobile robots may be located at different positions as shown in FIGS. 400a, 400b. For example, each mobile robot's reference frame or coordinate system may be associated with a location of the mobile robot's dock, a location at which the mobile robot was activated, a location set within software associated with the mobile robot, or the positions of the reference frames or coordinate systems 402a, 402b can differ for other reasons.

Because the positions of the reference frames or coordinate systems 402a, 402b of the first and second maps 400a, 400b associated with the first and second mobile robots differ, an (x, y) position determined in map 400a will not represent the same physical location as the same (x, y) positioned determined in map 400b. That is, a physical object located within the working environment will be represented by different (x, y) coordinates within the maps 400a, 400b associated with the two mobile robots.

This difference complicates sharing of map-based information between the first and second mobile robots. For example, positions determined with respect to the reference frame or coordinate system 402a within map 400a of the first mobile robot need to be translated or transformed into the coordinate system 402b within map 400b of the second mobile robot in order to be useable by the second mobile robot.

While discussions of reference frames or coordinate systems within this application are generally framed with respect to x-y coordinate systems, this is done by way of example and other types of coordinate systems, including three-dimensional coordinate systems, can be used.

FIGS. 5A-5I illustrate example steps in an embodiment of a process for determining a map transformation between two mobile robots R1, R2. Advantageously, in some embodiments, this process can be performed in an automated, automatic, and/or unsupervised manner. The process can be used to synchronize map data for different mobile robots. The process can be used for accurately representing the position and trajectory information of mobile robots in a shared or common reference frame. As will be described with more detail with reference to FIGS. 5A-5I, the process can include the use of a second mobile robot R2 ("follower" robot) autonomously following a first mobile robot R1 ("target" robot) as the target robot performs a known series of tasks. These tasks can include going to a series of goal locations. The position and trajectory information of the follower robot is recorded while it mimics the behavior of the target robot. After this process is finalized, the compiled position and trajectory data can be analyzed and automatically transformed into a common reference frame. Using this reference frame, a master control system can operate all mobile robots in the working environment effectively and with high accuracy, regardless of differences between the platforms. In some embodiments, the process can be repeated for application to more than two types of mobile robots.

Figure 5A:
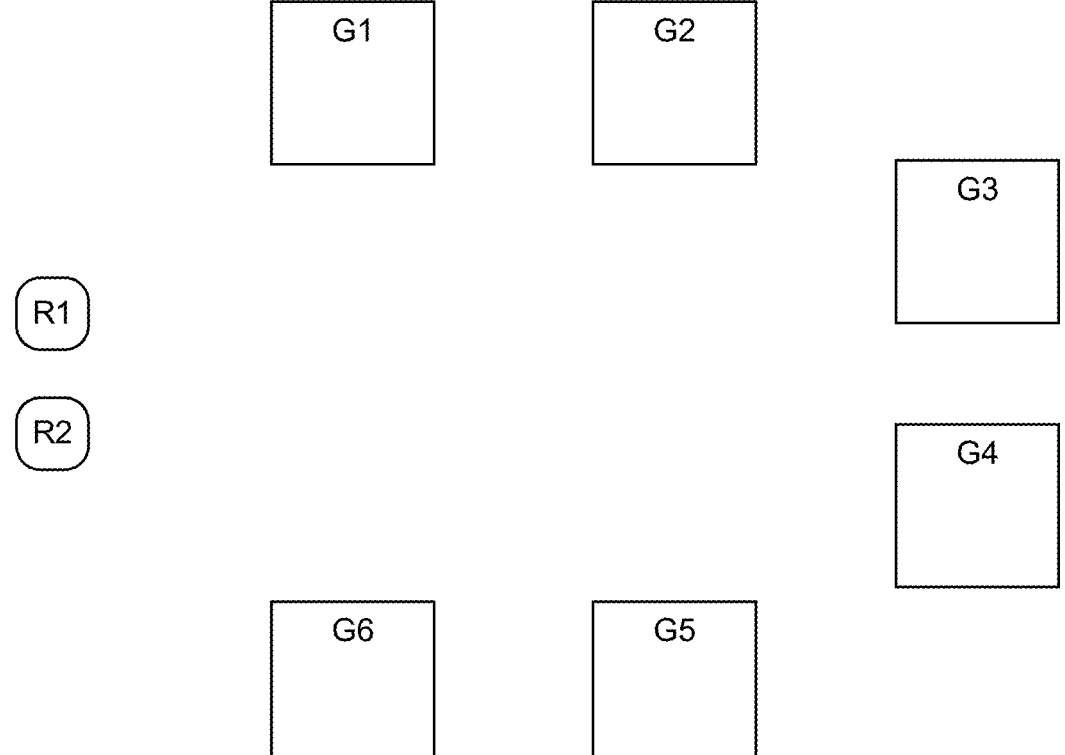
FIG. 5A illustrates an example step in an embodiment of an automated process for determining a map transformation between two mobile robots.

FIG. 5A illustrates two mobile robots, a first mobile robot R1 and a second mobile robot R2, in a working environment. In this example, each of the first and second mobile robots R1, R2 may have their own individual maps of the working environment, and as discussed previously, the individual maps of the two mobile robots R1, R2 may differ in one or more aspects. In some instances, the individual maps of the two mobile robots R1, R2 may have different individual coordinate frames such that an (x, y) position in one map does not correspond to the same (x, y) position in the other map. Because of this, mobile robots R1, R2 are not able to effectively share map-based data without a transform between the two maps.

FIG. 5A further illustrates a plurality of goal locations G1-G6 within the working environment. In this example, the goal locations comprise physical locations in the working environment through which both mobile robots R1, R2 will be moved as part of the process in order to determine the transformation. In the illustrated example, six goal locations are shown, although other numbers of goal locations can be used in other examples. For example, some embodiments of the process can use 2, 3, 4, 5, 6, 7, 8, 9, 10, 11, 12, 13, 14, 15, 16, 17, 18, 19, 20, 25, 30, 50 or more goal locations. In some instances, increasing the number of goal locations used can improve the accuracy of the determined transformation. However, it has been determined that use of 5, 10, or 20 goal locations can provide a sufficiently accurate transformation having an accuracy of less than 100 mm. The goal locations can be arranged in any pattern or configuration, for example, along one or more straight or curved paths. In some instances, the goal locations can be specific, preset locations within the working environment. In some embodiments, the goal locations can be determined by the first mobile robot R1 based on various factors, such as a current location of the first mobile robot R1, open space within the working environment, obstacles and other mobile robots within the working environment, etc. The goal locations should be spatially separated, but different distances between the goal locations can be used. For example, goal locations can be at least 10 cm, 50 cm, 1 m, 2 m, 2.5 m, 5 m or further apart, as well as other distances. In some instances, the goal locations are not known to the second mobile robot R2.

Figure 5B:
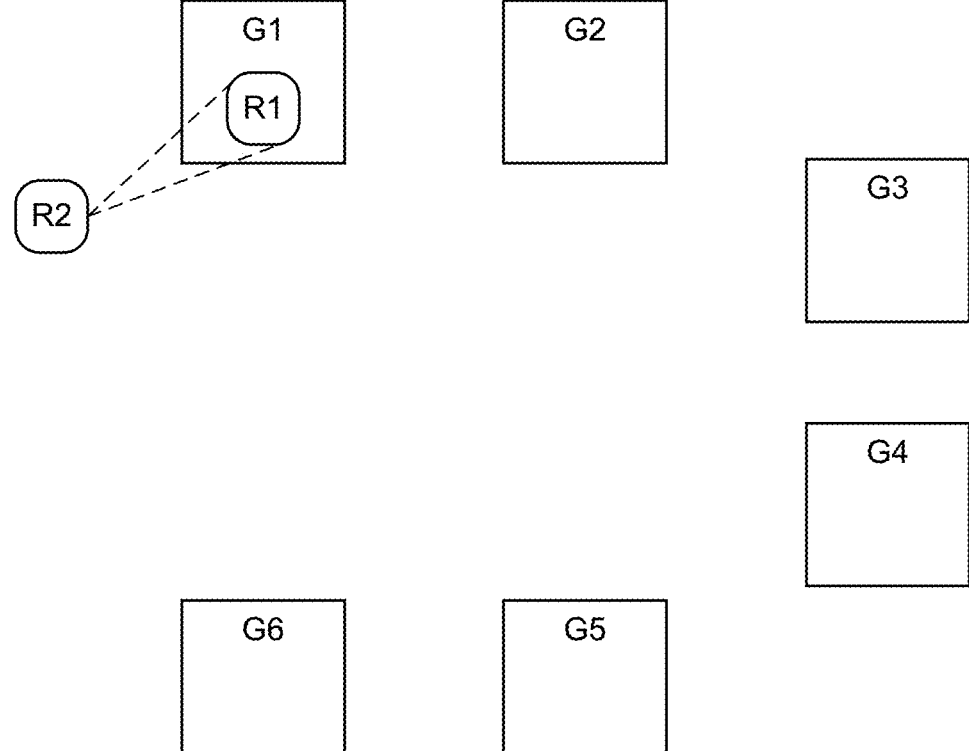
FIG. 5B illustrates another example step in the embodiment of an automated process for determining a map transformation between two mobile robots.

As shown in FIG. 5B, as a first step, the first mobile robot R1 (which may also be referred to as the target robot) moves to the first goal location G1. The first mobile robot R1 determines the location of the first goal location G1 within a first coordinate frame associated with the map of the first mobile robot R1. The determined location, represented in this example as $(X_{R1}1, y_{R1}1)$, can be recorded by the first mobile robot R1 and/or communicated to the second mobile robot R2 or a robot management system 200 (e.g., as shown in FIG. 3). In FIG. 5B, the position of the first goal G1 as determined by the first mobile robot R1 is recorded in a table as $(x_{R1}1, y_{R1}1)$.

With continued reference to FIG. 5B, with the first mobile robot R1 at the first goal location G1, the second mobile robot R2 can determine the position of the first mobile robot R1 relative to a current position of the second mobile robot R2. For example, the second mobile robot R2 can determine the distance and direction (e.g., linear distance and rotational orientation) to the first mobile robot R1. The second mobile robot R2 can observe (as illustrated using dashed lines in FIG. 5A) the first mobile robot R1 using one or more environmental sensors on the second mobile robot R2 (e.g., LiDAR, other optical sensors, or the like). As will be discussed with reference to FIG. 5C and subsequent figures, the second mobile robot R2 can use the observed position of the first mobile robot R1 as a mechanism for locating the first goal location G1.

Figure 5C:
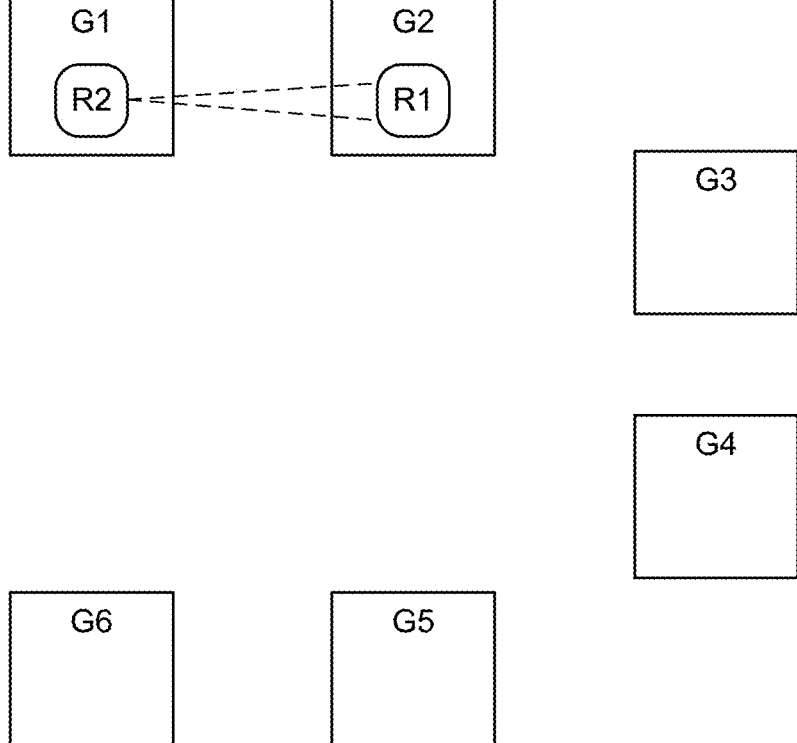
FIG. 5C illustrates another example step in the embodiment of an automated process for determining a map transformation between two mobile robots.

As shown in FIG. 5C, as a next step, the first mobile robot R1 (e.g., the target) moves to the second goal location G2. The first mobile robot R1 determines the location of the second goal location G2 within the first coordinate frame associated with the map of the first mobile robot R1. The determined location, represented in this example as $(x_{R1}2, y_{R1}2)$, can be recorded by the first mobile robot R1 and/or communicated to the second mobile robot R2 or the robot management system 200. In FIG. 5C, the position of the second goal G2 as determined by the first mobile robot R1 is recorded in a table as ($x_{R1}2$, $y_{R1}2$).

With the first goal location G1 vacated by the first robot R1, the second mobile robot R2 (e.g., the follower) can move to the position at which it observed the first mobile robot R1 when the first mobile robot R1 was at the first goal location G1. For example, the second mobile robot R2 can use encoder motion to move to the determined distance and direction at which it previously observed the first mobile robot R1. By moving to the position at which the second mobile robot R2 observed the first mobile robot R1 at the first goal location G1, the second mobile robot R2 can position itself at the first goal location G1. This can occur, even when the second mobile robot R2 does not know the position of the first goal location G1. Notably, the first mobile robot R1 cannot simply go to ($x_{R1}1$, $y_{R1}1$) (the position of the first goal location G1 recorded by the first mobile robot R1), because that data has not been provided within the coordinate system of the second mobile robot R2. However, by moving to the observed position, the second mobile robot R2 can move itself to the first goal location G1. With the second mobile robot R2 now at the first goal location G1, the position of the first goal location G1 can be determined by the second mobile robot R2 within the second coordinate frame associated with the map of the second mobile robot R2. The determined location, represented in this example as ($x_{R2}1$, $y_{R2}1$), can be recorded by the second mobile robot R2 and/or communicated to the first mobile robot R1 or the robot management system 200. In FIG. 5C, the position of the first goal G1 as determined by the second mobile robot R2 is recorded in a table as ($x_{R2}1$, $y_{R2}1$). As illustrated by the first line in the table in FIG. 5C, the position of the first goal location G1 is now known relative to the coordinate system of each mobile robot R1, R2.

With continued reference to FIG. 5C, with the first mobile robot R1 at the second goal location G2, the second mobile robot R2 can now determine the position of the first mobile robot R1 (while the first mobile robot R1 is at the second goal location G2) relative to the current position of second mobile robot R2 (e.g., the distance and direction to the first mobile robot R1). For example, the second mobile robot R2 can observe (as illustrated using dashed lines) the first mobile robot R1 using one or more environmental sensors on the second mobile robot R2. As before, the second mobile robot R2 can use this observed position to move itself to the second goal location G2 in a later step.

Figure 5D:
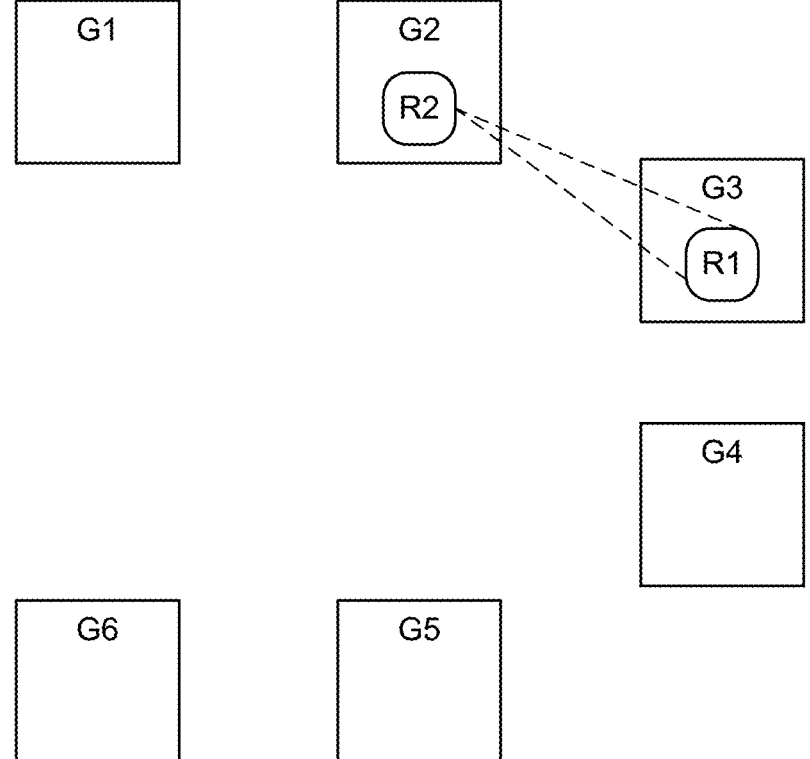
FIG. 5D illustrates another example step in the embodiment of an automated process for determining a map transformation between two mobile robots.

As shown in FIG. 5D, as a next step, the first mobile robot R1 (e.g., the target) moves to the third goal location G3. The first mobile robot R1 determines the location of the third goal location G3 within the first coordinate frame associated with the map of the first mobile robot R1. The determined location, represented in this example as ($x_{R1}3$, $y_{R1}3$), can be recorded by the first mobile robot R1 and/or communicated to the second mobile robot R2 or the robot management system 200. In FIG. 5D, the position of the third goal G3 as determined by the first mobile robot R1 is recorded in a table as ($x_{R1}3$, $y_{R1}3$).

With the second goal location G2 vacated by the first mobile robot R1, the second mobile robot R2 (e.g., the follower) can move to the position at which it observed the first mobile robot R1 when the first mobile robot R1 was at the second goal location G2 (e.g., using encoder motion). By moving to the position at which the second mobile robot R2 observed the first mobile robot R1 at the second goal location G1, the second mobile robot R2 can position itself at the second goal location G2. With the second mobile robot R2 now at the second goal location G2, the position of the second goal location G2 can be determined by the second mobile robot R2 within the second coordinate frame associated with the map of the second mobile robot R2. The determined location, represented in this example as ($x_{R2}2$, $y_{R2}2$), can be recorded by the second mobile robot R2 and/or communicated to the first mobile robot R1 or the robot management system 200. In FIG. 5D, the position of the second goal G2 as determined by the second mobile robot R2 is recorded in a table as ($x_{R2}2$, $y_{R2}2$). As illustrated by the second line in the table in FIG. 5D, the position of the second goal location G2 is now known relative to the coordinate system of each mobile robot R1, R2.

With continued reference to FIG. 5D, with the first mobile robot R1 at the third goal location G3, the second mobile robot R2 can determine the position of the first mobile robot R1 (while the first mobile robot R1 is at the third goal location G3) relative to a current position of the second mobile robot R2. For example, the second mobile robot R2 can observe (as illustrated using dashed lines) the first mobile robot R1 using one or more environmental sensors on the second mobile robot R2. As before, the second mobile robot R2 can use this observed position to move itself to the third goal location G3 in a later step.

Figure 5E:
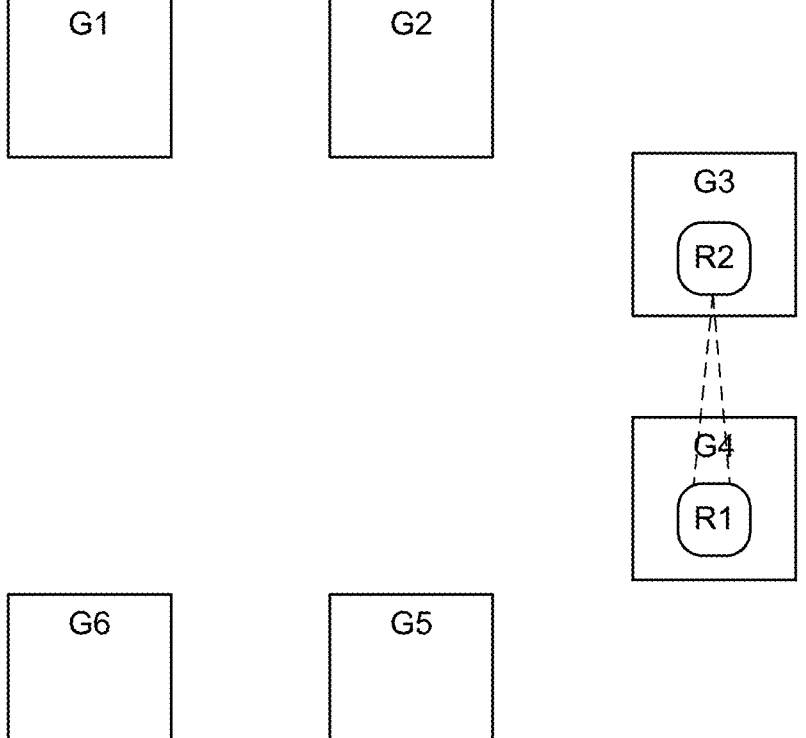
FIG. 5E illustrates another example step in the embodiment of an automated process for determining a map transformation between two mobile robots.

As shown in FIG. 5E, as a next step, the first mobile robot R1 (e.g., the target) moves to the fourth goal location G4. The first mobile robot R1 determines the location of the fourth goal location G4 within the first coordinate frame associated with the map of the first mobile robot R1. The determined location, represented in this example as ($x_{R1}4$, $y_{R1}4$), can be recorded by the first mobile robot R1 and/or communicated to the second mobile robot R2 or the robot management system 200. In FIG. 5E, the position of the fourth goal G4 as determined by the first mobile robot R1 is recorded in a table as ($x_{R1}4$, $y_{R1}4$).

With the third goal location G3 vacated by the first mobile robot R1, the second mobile robot R2 (e.g., the follower) can move to the position at which it observed the first mobile robot R1 when the first mobile robot R1 was at the third goal location G3 (e.g. using encoder-based motion). By moving to the position at which the second mobile robot R2 observed the first mobile robot R1 at the third goal location G3, the second mobile robot R2 can position itself at the third goal location G3. With the second mobile robot R2 now at the third goal location G3, the position of the third goal location G3 can be determined by the second mobile robot R2 within the second coordinate frame associated with the map of the second mobile robot R2. The determined location, represented in this example as ($x_{R2}3$, $y_{R2}3$), can be recorded by the second mobile robot R2 and/or communicated to the first mobile robot R1 or the robot management system 200. In FIG. 5E, the position of the third goal G3 as determined by the second mobile robot R2 is recorded in a table as ($x_{R2}3$, $y_{R2}3$). As illustrated by the third line in the table in FIG. 5E, the position of the third goal location G3 is now known relative to the coordinate system of each mobile robot R1, R2.

With continued reference to FIG. 5E, with the first mobile robot R1 at the fourth goal location G4, the second mobile robot R2 can determine the position of the first mobile robot R1 (while the first mobile robot R1 is at the fourth location G4) relative to the current position of the second mobile robot R2. For example, the second mobile robot R2 can observe (as illustrated using dashed lines) the first mobile robot R1 using one or more environmental sensors on the second mobile robot R2. As before, the second mobile robot R2 can use this observed position to move itself to the fourth goal location G4 in a later step.

Figure 5F:
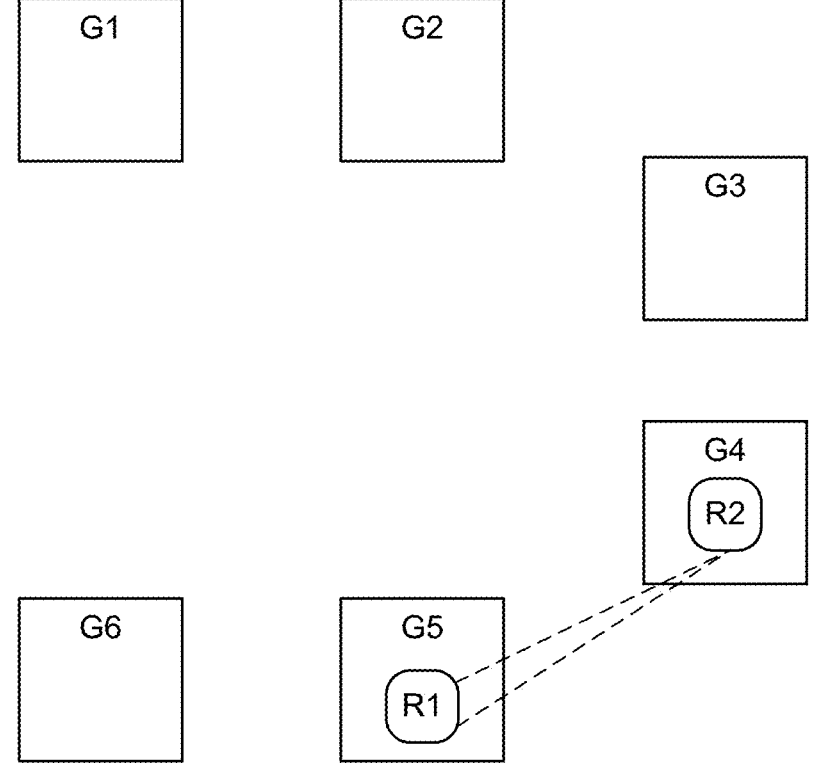
FIG. 5F illustrates another example step in the embodiment of an automated process for determining a map transformation between two mobile robots.

As shown in FIG. 5F, as a next step, the first mobile robot R1 (e.g., the target) moves to the fifth goal location G5. The first mobile robot R1 determines the location of the fifth goal location G5 within the first coordinate frame associated with the map of the first mobile robot R1. The determined location, represented in this example as $(x_{R1}5, y_{R1}5)$, can be recorded by the first mobile robot R1 and/or communicated to the second mobile robot R2 or the robot management system 200. In FIG. 5F, the position of the fifth goal G5 as determined by the first mobile robot R1 is recorded in a table as $(x_{R1}5, y_{R1}5)$.

With the fourth goal location G4 vacated by the first mobile robot R1, the second mobile robot R2 (e.g., the follower) can move to the position at which it observed the first mobile robot R1 when the first mobile robot R1 was at the fourth goal location G4 (e.g., using encoder-based motion). By moving to the position at which the second mobile robot R2 observed the first mobile robot R1 at the fourth goal location G4, the second mobile robot R2 can position itself at the fourth goal location G4. With the second mobile robot R2 now at the fourth goal location G4, the position of the fourth goal location G4 can be determined by the second mobile robot R2 within the second coordinate frame associated with the map of the second mobile robot R2. The determined location, represented in this example as $(x_{R2}4, y_{R2}4)$, can be recorded by the second mobile robot R2 and/or communicated to the first mobile robot R1 or the robot management system 200. In FIG. 5F, the position of the fourth goal G4 as determined by the second mobile robot R2 is recorded in a table as $(x_{R2}4, y_{R2}4)$. As illustrated by the fourth line in the table in FIG. 5E, the position of the fourth goal location G4 is now known relative to the coordinate system of each mobile robot R1, R2.

With continued reference to FIG. 5F, with the first mobile robot R1 at the fifth goal location G5, the second mobile robot R2 can determine the position of the first mobile robot R1 (while the first mobile robot R1 is at the fifth location G5) relative to a current position of the second mobile robot R2. For example, the second mobile robot R2 can observe (as illustrated using dashed lines) the first mobile robot R1 using one or more environmental sensors on the second mobile robot R2. As before, the second mobile robot R2 can use this observed position to move itself to the fifth goal location G5 in a later step.

Figure 5G:
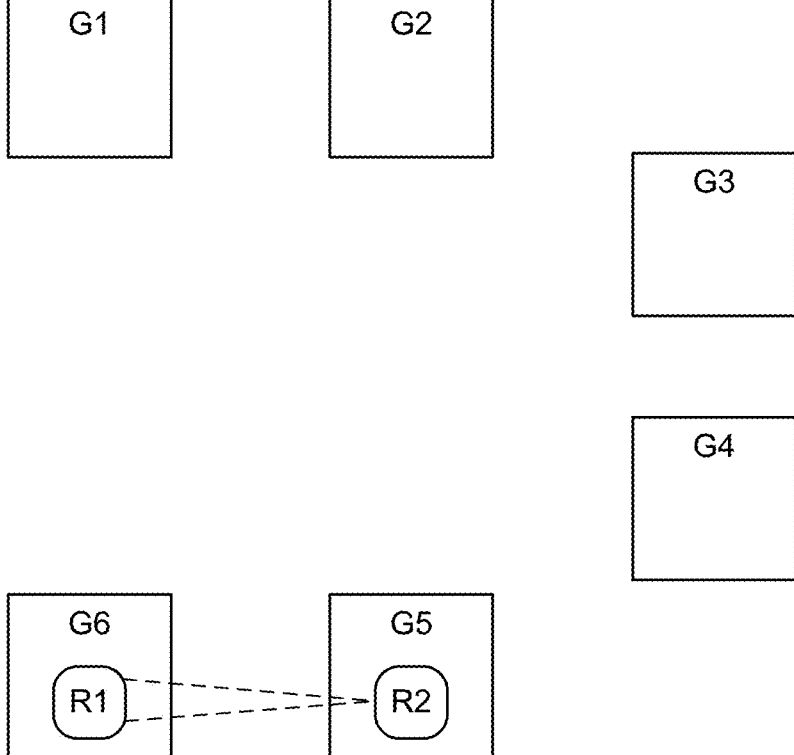
FIG. 5G illustrates another example step in the embodiment of an automated process for determining a map transformation between two mobile robots.

As shown in FIG. 5G, as a next step, the first mobile robot R1 (e.g., the target) moves to the sixth goal location G6. The first mobile robot R1 determines the location of the sixth goal location G6 within the first coordinate frame associated with the map of the first mobile robot R1. The determined location, represented in this example as $(x_{R1}6, y_{R1}6)$, can be recorded by the first mobile robot R1 and/or communicated to the second mobile robot R2 or the robot management system 200. In FIG. 5G, the position of the sixth goal G6 as determined by the first mobile robot R1 is recorded in a table as $(x_{R1}6, y_{R1}6)$.

With the fifth goal location G5 vacated by the first mobile robot R1, the second mobile robot R2 (e.g., the follower) can move to the position at which it observed the first mobile robot R1 when the first mobile robot R1 was at the fifth goal location G5 (e.g., using encoder-based motion). By moving to the position at which the second mobile robot R2 observed the first mobile robot R1 at the fifth goal location G5, the second mobile robot R2 can position itself at the fifth goal location G5. With the second mobile robot R2 now at the fifth goal location G5, the position of the fifth goal location G5 can be determined by the second mobile robot R2 within the second coordinate frame associated with the map of the second mobile robot R2. The determined location, represented in this example as $(x_{R2}5, y_{R2}5)$, can be recorded by the second mobile robot R2 and/or communicated to the first mobile robot R1 or the robot management system 200. In FIG. 5G, the position of the fifth goal G5 as determined by the second mobile robot R2 is recorded in a table as $(x_{R2}5, y_{R2}5)$. As illustrated by the fifth line in the table in FIG. 5G, the position of the fifth goal location G5 is now known relative to the coordinate system of each mobile robot R1, R2.

With continued reference to FIG. 5G, with the first mobile robot R1 at the sixth goal location G6, the second mobile robot R2 can determine the position of the first mobile robot R1 (while the first mobile robot R1 is at the sixth location G6) relative to a current position of the second mobile robot R2. For example, the second mobile robot R2 can observe (as illustrated using dashed lines) the first mobile robot R1 using one or more environmental sensors on the second mobile robot R2. As before, the second mobile robot R2 can use this observed position to move itself to the sixth goal location G6 in a later step.

Figure 5H:
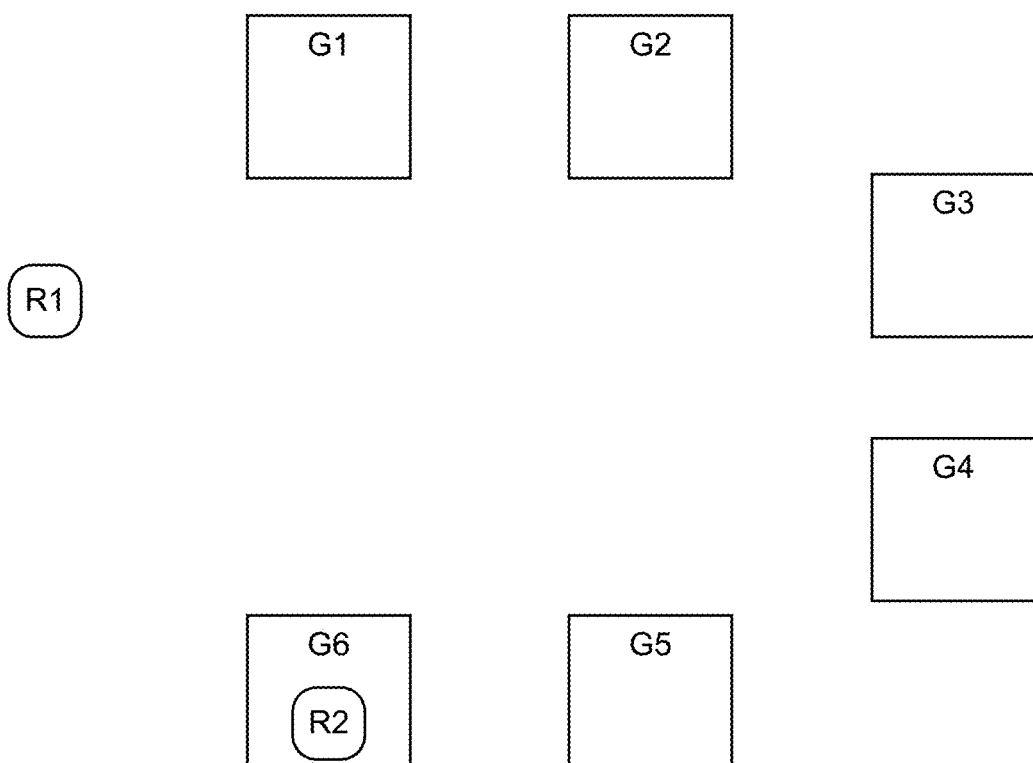
FIG. 5H illustrates another example step in the embodiment of an automated process for determining a map transformation between two mobile robots.

As shown in FIG. 5H, as a next step, the first mobile robot R1 (e.g., the target) moves off the sixth goal location G6. With the sixth goal location G6 vacated by the first mobile robot R1, the second mobile robot R2 (e.g., the follower) can move to the position at which it observed the first mobile robot R1 when the first mobile robot R1 was at the sixth goal location G6 (e.g., using encoder-based motion). By moving to the position at which the second mobile robot R2 observed the first mobile robot R1 at the sixth goal location G6, the second mobile robot R2 can position itself at the sixth goal location G6. With the second mobile robot R2 now at the sixth goal location G6, the position of the sixth goal location G6 can be determined by the second mobile robot R2 within the second coordinate frame associated with the map of the second mobile robot R2. The determined location, represented in this example as $(x_{R2}6, y_{R2}6)$, can be recorded by the second mobile robot R2 and/or communicated to the first mobile robot R1 or the robot management system 200. In FIG. 5H, the position of the sixth goal G6 as determined by the second mobile robot R2 is recorded in a table as $(x_{R2}6, y_{R2}6)$. As illustrated by the sixth line in the table in FIG. 5H, the position of the sixth goal location G6 is now known relative to the coordinate system of each mobile robot R1, R2.

Figure 5I:
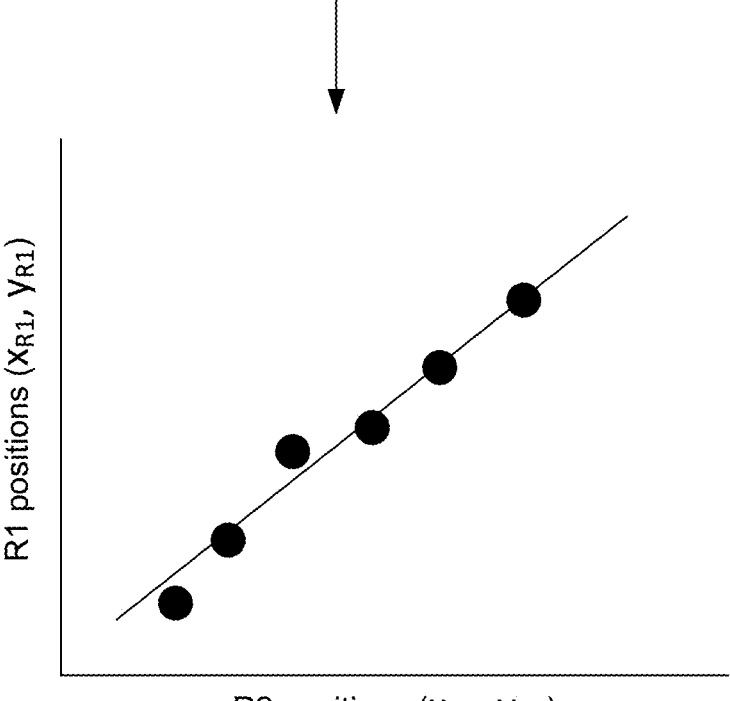
FIG. 5I illustrates another example step in the embodiment of an automated process for determining a map transformation between two mobile robots.

As shown in FIG. 5I, after the first and second mobile robots R1, R2 have moved through all goal locations G1-G6, the positions of the goal locations G1-G6 have been determined with respect to the coordinate frames of the maps associated with each mobile robot R1, R2. Thus, for each goal location G1-G6, a data pair (R1 data, R2 data) is provided. This data can be correlated to determine a transformation between the coordinate frames of the two mobile robots R1, R2. FIG. 5I represents an example of this step visually. As shown, that data pairs associated with each of the goal locations G1-G6 can be plotted. A function can be determined that best fits the plotted data pairs. In the illustrated examples, a least squares regression has been performed to fit a linear function to the plotted data. In other examples, other methods for fitting the data and other function, including non-linear functions can be used. For example, the transform can be determine using a least squares estimator (for example, that calculates an affine transformation). Other methods that can be used include total least squares, Machine learning methods (such as linear regressions). Nonlinear transformations can be determined using, for example, polynomial regression or support vector regression, among others. With the function determined, data in one coordinate frame (e.g., the coordinate frame of the first mobile robot R1) can be translated into the coordinate frame of the other mobile robot (e.g., the second mobile robot).

Although the example process of FIGS. 5A-5I uses discrete goal locations where the two mobile robots R1, R2 stop during the process, in other embodiments, the process can be performed using continuous linear and/or curved paths. For example, the target robot can move along a path while being observed by the follower robot. The follower robot can then follow along the same path generated paired data which can be used to determine a transform.

FIG. 6 is a flow chart illustrating an example process or method 600 for determining a map transformation between mobile robots. In the illustrated example, the method 600 begins at block 602. At a block 602, a first mobile robot is moved to a goal location. The first mobile robot may be associated with a first map. The first map may be determined or generated by the first mobile robot.

At block 604, the method includes determining a first position of the first mobile robot at the goal location. The first position can be determined with respect to the first map of the first mobile robot.

At block 606, the method includes determining an observed position of the first mobile robot at the goal location using a second mobile robot. For example, the second mobile robot can use one or more environmental sensors to observe or otherwise determine the position of the first mobile robot at the goal position. The second mobile robot may be associated with a second map. The second map may be determined or generated by the second mobile robot. The observed position can be determined with respect to a current position of the second mobile robot. For example, the second mobile robot can determine the distance and direction to the first mobile robot relative to the current position of the second mobile robot.

At block 610, the first mobile robot moves off the goal location. At block 612, the second mobile robot moves to the goal location and the method includes determining a second position of the second mobile robot at the goal location. The second position can be determined by the second mobile robot with respect to the second map.

Through decision state 612, blocks 602-610 are repeated for a plurality of goal locations until sufficient goal locations have been used. In some embodiments, 2, 3, 4, 5, 6, 7, 8, 9, 10, 11, 12, 13, 14, 15, 16, 17, 18, 19, 20, 25, 30, 50 or more goal locations can be used. In some instances, increasing the number of goal locations used can improve the accuracy of the determined transformation. However, it has been determined that use of 5, 10, or 20 goal locations can provide a sufficiently accurate transformation having an accuracy of less than 100 mm.

At block 616, once sufficient goal locations have been used, a transformation is determined that relates map information from the first mobile robot and the second mobile robot based on the determined first positions and the determined second positions. The transformation can be used to relate map information in the first map to map information in the second map. This can facilitate sharing of map information between the first and second mobile robots.

Figure 7:
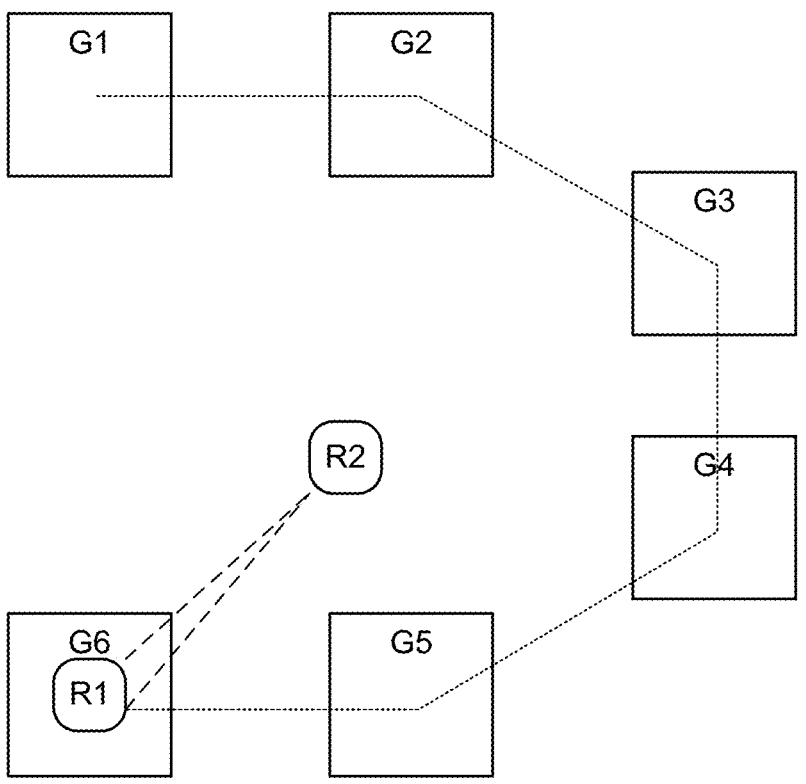
FIG. 7 illustrates an example step in another embodiment of an automated process for determining a map transformation between two mobile robots.

FIG. 7 illustrate example steps in another embodiment of a process for determining a map transformation between two mobile robots R1, R2. Advantageously, in some embodiments, this process can be performed in an automated, automatic, and/or unsupervised manner. The process can be used to synchronize map data for different mobile robots. The process can be used for accurately representing the position and trajectory information of mobile robots in a shared or common reference frame. In this example, a first mobile robot R1 (e.g., a target robot) moves through a plurality of goal locations G1-G6 and records and/or reports its position relative to its own map at each goal location. A second mobile robot R2 observes (using its environmental sensors) the first mobile robot R1 at each goal location. The second mobile robot R2 or a robot management system 200 can determine the position of each of the plurality of goal locations based on the observed positions of the first mobile robot R1. For example, while the first mobile robot R1 is at each goal location, the second mobile robot R2 can determine, using its environmental sensors, the position of the first mobile robot R1 relative to the current position of the second mobile robot R2. For example, the distance and direction to the first mobile robot R1 can be determined. With this information as well as the current position of the second mobile robot R2 within its own map, the second mobile robot R2 or a robot management system can determine the position of the goal locations G1-G6 in the map of the second mobile robot R2.

In some embodiments, the second mobile robot R2 need not move at all as long as it can accurately observe the distance and direction to the first mobile robot R1 while the first mobile robot R1 is at each goal location. In some embodiments, the second mobile robot R2 may follow (either exactly or to some lesser extent) the first mobile robot R1 as it moves through the goal locations G1-G6.

In the illustrated embodiment of FIG. 7, the first mobile robot R1 has moved through each of the goal locations G1-G6 and is currently positioned at G6. At each goal location, the first mobile robot R1 has recorded and/or reported its position within its own map (column R1 in the table). The second mobile robot R2 has observed the first mobile robot R1 at each goal location, for example, by determining the position of the first mobile robot R1 relative to its own position. Using this information, the positions of the goal locations within the map of the second mobile robot R2 can be determined (column R2 of the table). Thus, for each goal location G1-G6, a data pair (R1 data, R2 data) is provided. This data can be correlated to determine a transformation between the coordinate frames of the two mobile robots R1, R2 as described above.

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAS, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise." "comprising." "include," "including." and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could." "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

Any ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant."

What is claimed is:

1. A method for determining a map transformation between mobile robots, the method comprising:

causing a first mobile robot to move to each of a plurality of goal locations within a working environment, and, with the first mobile robot positioned at each of the plurality of goal locations:

determining a first position of the first mobile robot within a first map associated with the first mobile robot, and determining an observed position of the first mobile robot relative to a position of a second mobile robot based on data from at least one environmental sensor of the second mobile robot;

causing the second mobile robot to move to each observed position, and with the second mobile robot positioned at each observed position, determining a second position of the second mobile robot within a second map associated with the second mobile robot; and determining a transformation between the first map associated with the first mobile robot and the second map associated with the second mobile robot based on the determined first positions and the determined second positions.

2. The method of claim 1, wherein determining the observed position of the first mobile robot relative to the position of the second mobile robot comprises determining a distance and a direction from the second mobile robot to the first mobile robot.

3. The method of claim 2, wherein causing the second mobile robot to move to each observed position comprises moving the second mobile robot in the determined distance and direction.

4. The method of claim 3, wherein moving the second robot in the determined distance and direction comprises performing encoder-based motion.

5. The method of claim 1, wherein the second mobile robot sequentially follows the first mobile robot through each of the plurality of goal locations.

6. The method of claim 1, wherein a first coordinate frame of the first map is different than a second coordinate frame of the second map.

7. The method of claim 1, further comprising:

receiving position data from the first mobile robot;

applying the transformation to the position data to produce transformed position data; and communicating the transformed position data to the second mobile robot.

8. The method of claim 1, further comprising:

receiving position data from the second mobile robot;

applying the transformation to the position data to produce transformed position data; and communicating the transformed position data to the first mobile robot.

9. The method of claim 1, wherein the plurality of goal locations comprises a plurality of predetermined locations.

10. The method of claim 1, wherein the plurality of goal locations is determined by the first mobile robot based on a current position of the first mobile robot.

11. The method of claim 1, wherein the transformation is configured to represent map-based data from the first and second mobile robots in a common reference frame.

12. A mobile robot management system, comprising:

a communication module configured to communicate with at least a first mobile robot and a second mobile robot in a working environment;

a processor; and computer-readable memory in communication with the processor, the memory storing instructions that are executable by the processor to cause the system to:

cause the first mobile robot to move to each of a plurality of goal locations within the working environment, and, with the first mobile robot positioned at each of the plurality of goal locations:

determine a first position of the first mobile robot within a first map associated with the first mobile robot, and determine an observed position of the first mobile robot relative to a second mobile robot based on data from at least one environmental sensor of the second mobile robot;

cause the second mobile robot to move to each observed position, and with the second mobile robot positioned at each observed position, determine a second position of the second mobile robot within a second map associated with the second mobile robot; and determine a transformation between the first map associated with the first mobile robot and the second map associated with the second mobile robot based on the determined first positions and the determined second positions.

13. The system of claim 12, wherein determining the observed position of the first mobile robot relative to the position of the second mobile robot comprises determining a distance and a direction from the second mobile robot to the first mobile robot.

14. The system of claim 13, wherein causing the second mobile robot to move to each observed position comprises moving the second mobile robot in the determined distance and direction.

15. The system of claim 14, wherein moving the second robot in the determined distance and direction comprises performing encoder-based motion.

16. The system of claim 12, wherein the second mobile robot is configured to sequentially follow the first mobile robot through each of the plurality of goal locations.

17. The system of claim 12, wherein a first coordinate frame of the first map is different than a second coordinate frame of the second map.

18. The system of claim 12, wherein the processor is further configured to:

receive position data from the first mobile robot;

apply the transformation to the position data to produce transformed position data; and communicate the transformed position data to the second mobile robot.

19. The system of claim 12, further comprising:

receive position data from the second mobile robot;

apply the transformation to the position data to produce transformed position data; and communicate the transformed position data to the first mobile robot.

20. A mobile robot, comprising:

a drive system configured to move the mobile robot;

at least one environmental sensor;

a processor; and computer-readable memory in communication with the processor, the memory storing instructions that are executable by the processor to cause the mobile robot to:

for each of a plurality of goal locations through which a target mobile robot moves:

receive, from the target mobile robot, a first position of the target mobile robot within a first map associated with the target mobile robot, and determine an observed position of the target mobile robot relative to a current position of the mobile robot based on data from the at least one environmental sensor of the mobile robot;

cause the mobile robot to move to the observed position, and with the mobile robot positioned at the observed position, determine a second position of the mobile robot within a second map associated with the mobile robot; and determine a transformation between the first map associated with the target mobile robot and the second map associated with the mobile robot based on the determined first positions and the determined second positions.

* * * * *